United States Patent
Bucher et al.

(10) Patent No.: US 6,829,390 B2
(45) Date of Patent: Dec. 7, 2004

(54) METHOD AND APPARATUS FOR TRANSMITTING IMAGE UPDATES EMPLOYING HIGH COMPRESSION ENCODING

(75) Inventors: Roger Bucher, Zollikofen (CH); Tsung-Yen Chen, Fremont, CA (US)

(73) Assignee: Oridus, Inc., Fremont, CA (US)

( * ) Notice: Subject to any disclaimer, the term of this patent is extended or adjusted under 35 U.S.C. 154(b) by 635 days.

(21) Appl. No.: 09/940,098

(22) Filed: Aug. 27, 2001

(65) Prior Publication Data

US 2003/0039391 A1 Feb. 27, 2003

(51) Int. Cl.$^7$ .......................... G06K 9/36; G06K 9/68
(52) U.S. Cl. ................................ 382/232; 382/218
(58) Field of Search ........................ 382/162, 166, 382/232, 233, 235, 239, 218, 244, 246, 251; 358/246.01; 341/51; 378/240.03, 240.17, 240.25

(56) References Cited

U.S. PATENT DOCUMENTS

| | | | | |
|---|---|---|---|---|
| 4,679,079 A | * | 7/1987 | Catros et al. | 375/240.14 |
| 5,177,480 A | * | 1/1993 | Clark | 341/51 |
| 5,648,773 A | * | 7/1997 | Guy | 341/51 |
| 5,848,195 A | * | 12/1998 | Romriell | 382/246 |
| 6,195,128 B1 | * | 2/2001 | Streater | 375/240.12 |
| 6,317,515 B1 | * | 11/2001 | Kurtze et al. | 382/166 |
| 6,381,368 B1 | * | 4/2002 | Kanatsu | 382/233 |
| 6,668,090 B1 | * | 12/2003 | Joshi et al. | 382/239 |

* cited by examiner

*Primary Examiner*—Andrew W. Johns
*Assistant Examiner*—Amir Alavi
(74) *Attorney, Agent, or Firm*—Victor H. Okumoto

(57) ABSTRACT

A method and apparatus for transmitting image updates employing high compression encoding are described. New and old image pixel values are compared at corresponding coordinate positions. For coordinate positions where the values are significantly different, the new image pixel values are assigned to those coordinates unless the new image pixel value is equal to a predefined transparent pixel value. In that case, a pixel value resulting in a color imperceptibly different than the new image pixel value is assigned. On the other hand, for coordinate positions where the values are not significantly different, then the predefined transparent pixel is assigned to those coordinates. Because of the high occurrence of the transparent pixel value in many applications, the pixel values assigned in such a manner are suitable for high compression encoding and consequently, high speed transmission.

36 Claims, 3 Drawing Sheets

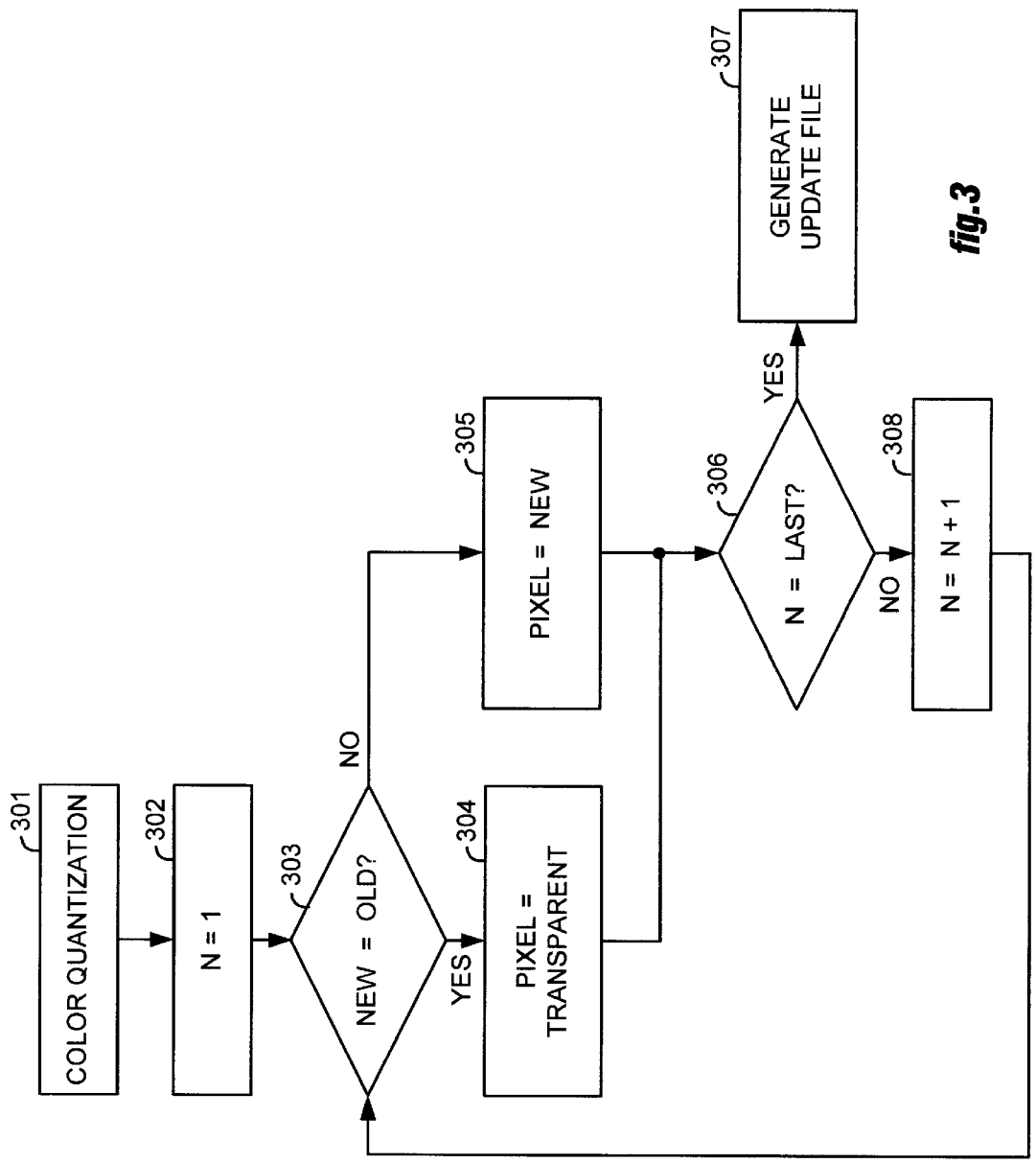

METHOD AND APPARATUS FOR TRANSMITTING IMAGE UPDATES EMPLOYING HIGH COMPRESSION ENCODING

FIELD OF THE INVENTION

The present invention generally relates to techniques for transmitting images between computers using encoded image files and in particular, to a method and apparatus for transmitting image updates employing high compression encoding.

BACKGROUND OF THE INVENTION

There are a number of well-known graphics formats that allow easy storage and transmission of image files between computers. To minimize the size of the files and the time it takes to download them, some of these graphics formats employ data compression.

When transmitting a sequence of images, each image in the sequence may only be modestly different than an immediately prior image. Therefore, to further reduce the size of the image files and the time it takes to download them it is desirable to store and transmit only update portions of the images. Unfortunately, when information for the full screen or a full rectangular window of the screen must be transmitted each time, unchanged as well as changed portions of the images must be transmitted, thus preventing realization of the full savings from such an approach.

OBJECTS AND SUMMARY OF THE INVENTION

Accordingly, it is an object of the present invention to provide a method for transmitting image file updates employing high compression encoding.

Another object is to provide an apparatus for transmitting image file updates employing high compression encoding.

These and additional objects are accomplished by the various aspects of the present invention, wherein briefly stated, one aspect is a method for transmitting image updates employing high compression encoding, comprising: comparing new image pixel values against old image pixel values at corresponding coordinates respectively of a new image and an old image; providing new image pixel values for coordinates where the new image pixel values are significantly different than the old image pixel values and not equal to a transparent pixel value; and providing the transparent pixel value for coordinates where the new image pixel values are not significantly different than the old image pixel values.

In another aspect, an apparatus for transmitting image updates employing high compression encoding comprises circuitry for comparing new image pixel values against old image pixel values at corresponding coordinates respectively of a new image and an old image; providing new image pixel values for coordinates where the new image pixel values are significantly different than the old image pixel values and not equal to a transparent pixel value; and providing the transparent pixel value for coordinates where the new image pixel values are not significantly different than the old image pixel values.

In still another aspect, an apparatus for transmitting image updates employing high compression encoding comprises means for comparing new image pixel values against old image pixel values at corresponding coordinates respectively of a new image and an old image; means for providing new image pixel values for coordinates where the new image pixel values are significantly different than the old image pixel values and not equal to a transparent pixel value; and means for providing the transparent pixel value for coordinates where the new image pixel values are not significantly different than the old image pixel values.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 3 illustrates a flow diagram of a preferred method for transmitting image updates employing high compression encoding, utilizing aspects of the present invention.

DETAILED DESCRIPTION OF THE PREFERRED EMBODIMENT

Figure 1:
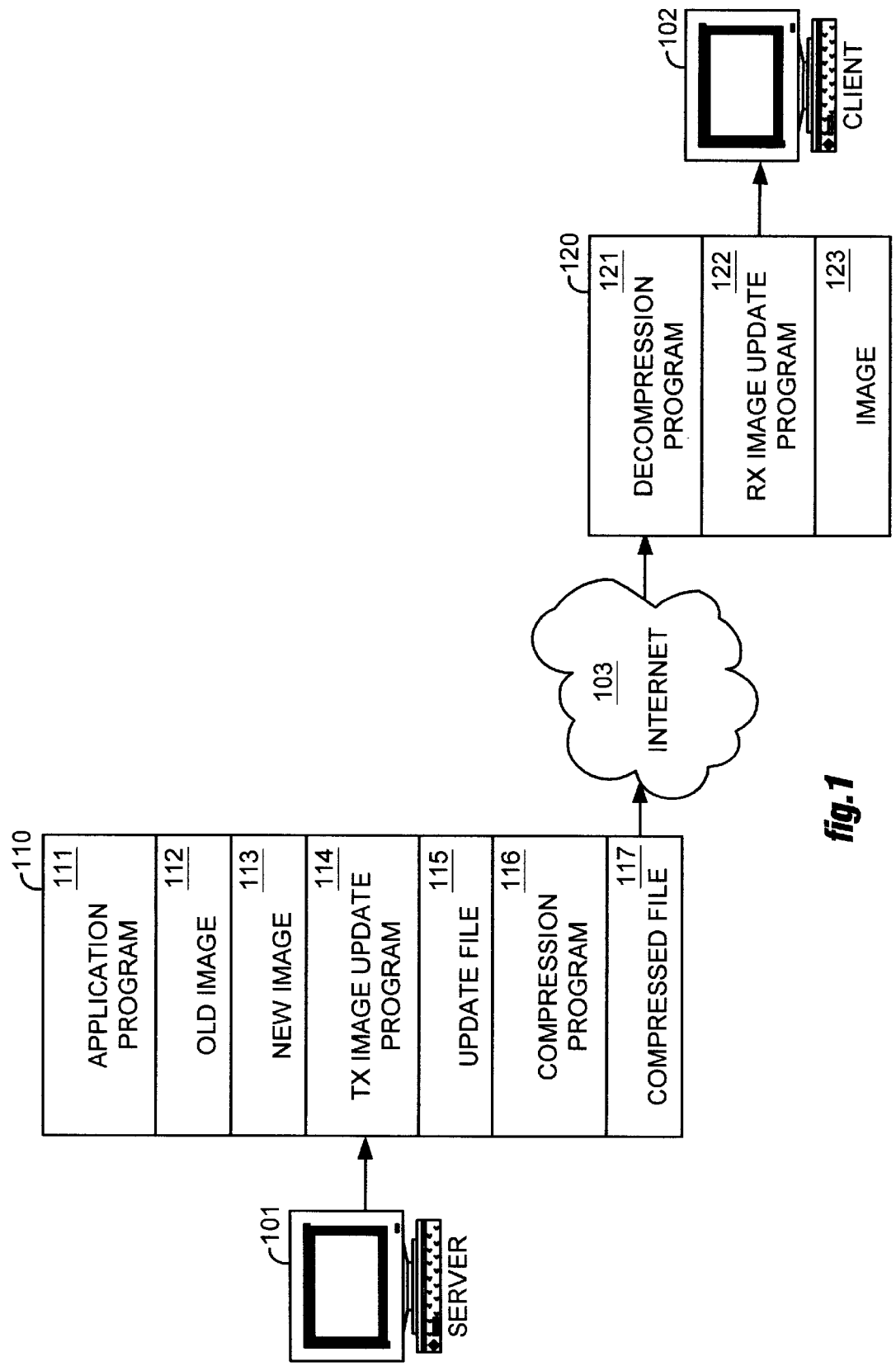
FIG. 1 illustrates a block diagram of a computer system including an apparatus for transmitting image updates employing high compression encoding, utilizing aspects of the present invention.

FIG. 1 illustrates, as an example, a block diagram of a computer system including an apparatus for transmitting image updates employing high compression encoding. The apparatus includes a server computer 101 programmed to transmit encoded image updates for a sequence of images to a remote client computer 102 through a communication medium such as the Internet 103.

An application program 111 that resides in a conventional memory system 110 of the server computer 101 generates the sequence of images. The images in this case are related to one another such as frames in video or animation, so that each image is often only partially different than its immediately preceding or succeeding image in the sequence. The memory system 110 includes both mass storage such as a hard disk, and system memory including solid-state memory such as dynamic random access memory.

In one embodiment, two images are stored in the memory system 110 of the server computer 101 at one time. An old image whose information has already been transmitted to the client computer 102 is stored in a buffer 112, and a new image whose information is to be transmitted next is stored in a buffer 113. After the information for the new image is transmitted, then the image stored in the buffer 113 effectively becomes the old image, and the next image in the sequence becomes the new image that is then stored in old image's buffer 112. In this way, the locations of the new and old images flip-flop between buffer 112 and 113 whenever information for an image is transmitted.

Figure 2:
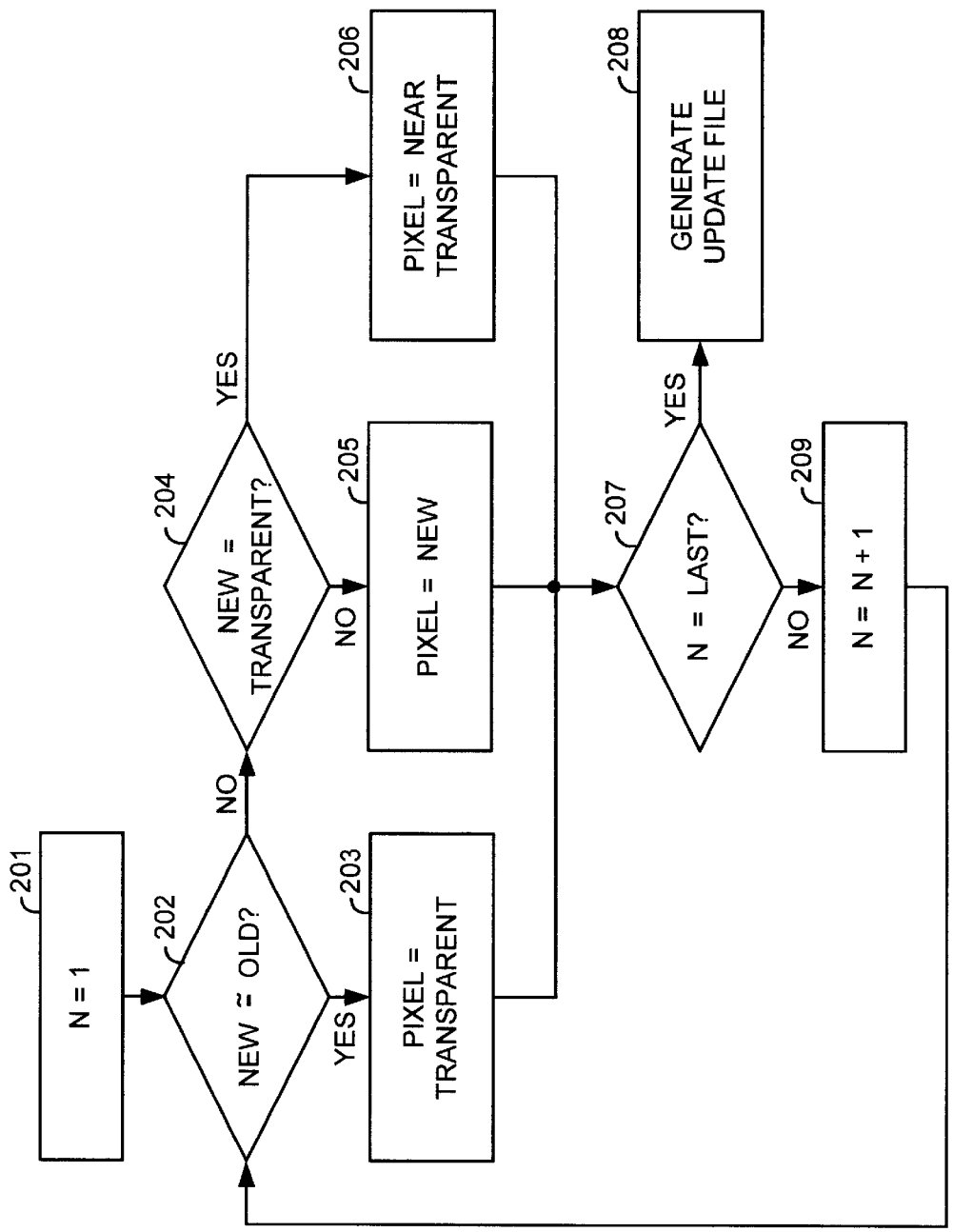
FIG. 2 illustrates a flow diagram of a method for transmitting image updates employing high compression encoding, utilizing aspects of the present invention.

A transmitting side (TX) image update program 114 residing in the memory system 110 of the server computer 101 generates an update image file 115 according to the method described in reference to FIG. 2 or the method described in reference to FIG. 3. In brief, the update image file 115 includes information of the differences and similarities between the old image 112 and new image 113 for a rectangular window. Preferably, the update file 115 is stored in another buffer of the memory system 110.

A compression program 116 residing in the memory system 110 of the server computer 101 encodes and compresses the update image file 115 to form a compressed update image file 117, using a conventional loss-less compressed data format such as ZLIB. Other suitable formats include the graphics interchange format (GIF), and the joint photographic experts group format (JPEG). JPEG, however, is generally not a preferred format for this application, because it is a lossy compression technique.

The server computer 101 then transmits the compressed update image file 117 to the client computer 102 through the communication medium 103. Although the Internet is shown as the preferred communication medium in this example, it is to be appreciated that the scope of the present invention is not to be so limited.

A decompression program 121 residing in a memory system 120 of the client computer 102 receives and decompresses the compressed update image file 117 to recover the update image file 115. The decompression program 121 in this case is complementary to the compression program 116 to facilitate its decoding and decompression.

A receiving side (RX) image update program 122 residing in the memory system 120 of the client computer 102 then decodes the update image file 115 in order to update the old image stored in a buffer 123 of the memory system 120 of the client computer 102 with the new image information included in the update image file 115. Typically, buffer 123 is a frame buffer of solid-state memory residing in the client computer 102.

The receiving side (RX) image update program 122 is complementary to the transmitting side (TX) image update program 114 to facilitate its decoding. In particular, the receiving side (RX) image update program 122 updates the old image by retaining the old image pixel values for coordinates having a transparent pixel value (as described in reference to FIG. 2 or FIG. 3), and replacing the old image pixel values with corresponding new image pixel values specified in the update image file 115 for other coordinates.

Although the apparatus for transmitting image updates employing high compression encoding is described as being the programmed server computer 101 in this example, it is to be appreciated that the apparatus may take many forms including in its most basic form, circuitry that performs the described functions of the programmed server computer 101. The circuitry may also take many forms that are all contemplated within the full scope of the present invention, including hardwired logic, or the use of one or more processors programmed by software or firmware to perform the described functions of the programmed server computer 101.

FIG. 2 illustrates, as an example, a flow diagram of a method for transmitting image updates employing high compression encoding that is preferably performed by the TX image update program 114 of FIG. 1. In 201, a pointer is initialized to a first coordinate or pixel position in the buffers 112 and 113. Buffer 112 is storing at this time an old image and buffer 113 is storing a new image.

In 202, a new image pixel value is compared against an old image pixel value at the coordinate being pointed to at the time by the pointer. If the new image pixel value is not significantly different than the old image pixel value, then in 203, a transparent pixel value is assigned to that coordinate position in an update image file 115.

The transparent pixel value is preferably a repetitive sequence of characters to ensure maximum compressibility through uniformity such as, for examples, a binary number with all "0's" or all "1's". The determining factor on whether or not two pixel values are significantly different is whether or not the colors corresponding to those pixel values are perceptibly different to the human eye. Such determination may be made through empirical data, or it may be made by selecting a threshold value that is determined using conventional trial and error techniques.

If the new image pixel value is significantly different than the old image pixel value, however, then in 204, it is next determined whether the new image pixel value equals the transparent pixel value. If it does not, then in 205, the new image pixel value is assigned to that coordinate position in the update image file 115. On the other hand, if it does, then in 206, a pixel value of preferably just one less or one more than the transparent pixel value is assigned to that coordinate position in the update image file 115.

In 207, the pointer is checked to see if it is pointing to the last coordinate or pixel position in the buffers 112 and 113. If it is not pointing to the last coordinate position, then in 209, the pointer is incremented by one coordinate position, and the method jumps back to 202 to process the next pair of new image and old image pixel values at that coordinate position.

If the pointer is pointing to the last coordinate position, however, then all new image pixel values and old image pixel values at corresponding coordinates have been compared. Therefore, in 208, the method now generates the update file 115. Although the update file 115 may include assigned pixel values for all coordinates of the buffers 112 and 113, preferably it is reduced to information for only a smallest rectangle including all of the coordinates having new image pixel value assignments. Since the omitted coordinates in this case all have transparent pixel values, the receiving side (RX) image update program 122 can assume these values without actually receiving them, thus reducing the necessary size of the update image file 115 and the time it takes to transmit it to the client computer 102.

The update image file 115 is configured for high compression encoding by generating it in this manner. This is because the compression programs employed with this method provide a higher compression of data where there is a large number of a repetitive value in that data. Consequently, high compression encoding of the update image file 115 is assured since all unchanged image pixel values between old and new images are assigned the same transparent pixel value even though those unchanged pixels themselves may all be different.

FIG. 3 illustrates a flow diagram of a preferred method for transmitting image updates employing high compression encoding. In 301, the new and old images are first subjected to color quantization in RGB color space so that pixel values that are not significantly different will be in the same color space and will therefore, get the same color index value. In this method, the "transparent pixel" is first assigned a color index value such as "0" before color quantization takes place, thereby making this color index value unavailable for image pixel values. The TX image update program 114 may perform the color quantization, or a separate program not shown in FIG. 1 may perform it.

As is well known, in the RGB color model, colors are arranged in a 3 dimensional cube. In the color map, two adjacent color indexes are not necessarily similar colors. For example, color index 7 may be totally different than color index 8 depending on the color map. To find out if two colors are similar, it is necessary to calculate the distance of the true color values in the color space.

In the method, 302–304 are then performed substantially in the same manner as described in reference to their counterparts 201–203 of FIG. 2, except that in 303 and 304, the transparent pixel value is assigned to a coordinate position only if the color quantized new image pixel value and the color quantized old image pixel value are equal. There is no need to check to see if the pixel values are "significantly different" as in the method described in reference to FIG. 2, because that threshold effect is effected through the initial color quantization of the new and old images as performed in 301. Continuing with the method, 305–308 are then performed substantially in the same manner as described in reference to their counterparts 205 and 207–209 of FIG. 2. Note that there are no equivalents to 204 and 206 in this method since the new and old pixel values cannot equal the transparent pixel value by construction.

Although the various aspects of the present invention have been described with respect to a preferred embodiment, it will be understood that the invention is entitled to full protection within the full scope of the appended claims.

We claim:

1. A method for transmitting image updates employing high compression encoding, comprising:
   comparing new image pixel values against old image pixel values at corresponding coordinates respectively of a new image and an old image; and
   providing new image pixel values for coordinates where said new image pixel values are significantly different than said old image pixel values and not equal to a transparent pixel value, and providing said transparent pixel value for coordinates where said new image pixel values are not significantly different than said old image pixel values.

2. The method according to claim 1, wherein said providing new image pixel values for coordinates where said new image pixel values are significantly different than said old image pixel values, comprises:
   providing new image pixel values for coordinates where said new image pixel values are significantly different than said old image pixel values unless said new image pixel values are equal to said transparent pixel value; and
   providing a pixel value corresponding to an imperceptibly different color than said transparent pixel value for coordinates where said new image pixel values are significantly different than said old image pixel values and equal to said transparent pixel value.

3. The method according to claim 1, wherein said providing new image pixel values for coordinates where said new image pixel values are significantly different than said old image pixel values and not equal to a transparent pixel value, comprises providing said new image pixel values for coordinates where said new image pixel values correspond to colors perceptibly different from those corresponding to said old image pixel values unless said new image pixel values are equal to said transparent pixel value.

4. The method according to claim 1, wherein said providing new image pixel values for coordinates where said new image pixel values are significantly different than said old image pixel values and not equal to a transparent pixel value, comprises providing said new image pixel values in a compressed image file.

5. The method according to claim 1, wherein said providing said transparent pixel value for coordinates where said new image pixel values are not significantly different than said old image pixel values, comprises providing a repetitive sequence of characters to ensure maximum uniformity and compressibility for coordinates where said new image pixel values are not significantly different than said old image pixel values.

6. The method according to claim 5, wherein said repetitive sequence of characters consists of a binary number having all zeroes.

7. The method according to claim 5, wherein said repetitive sequence of characters consists of a binary number having all ones.

8. The method according to claim 1, wherein said providing said transparent pixel value for coordinates where said new image pixel values are not significantly different than said old image pixel values, comprises providing said transparent pixel value for coordinates where said new image pixel values correspond to colors imperceptibly different from those corresponding to said old image pixel values.

9. The method according to claim 1, wherein said providing a transparent pixel value for coordinates where said new image pixel values are not significantly different than said old image pixel values, comprises providing said transparent pixel value for coordinates in a compressed image file.

10. The method according to claim 9, further comprising:
    decompressing said compressed image file; and
    updating a copy of said old image by retaining old image pixel values of said copy for coordinates having said transparent pixel value, and replacing old image pixel values of said copy with corresponding new image pixel values for other coordinates according to information in said compressed image file.

11. The method according to claim 1, further comprising color quantization of said new and old images in RGB color space so that pixel values that are not significantly different will be in the same color space.

12. The method according to claim 11, wherein said comparing new image pixel values against old image pixel values at corresponding coordinates respectively of a new image and an old image, comprises comparing color quantized new image pixel values against color quantized old image pixel values at corresponding coordinates respectively of said new image and said old image.

13. The method according to claim 12, wherein said providing new image pixel values for coordinates where said new image pixel values are significantly different than said old image pixel values and not equal to a transparent pixel value, comprises providing color quantized new image pixel values for coordinates where said color quantized new image pixel values are not equal to said color quantized old image pixel values or said transparent pixel value.

14. The method according to claim 13, wherein said providing said transparent pixel value for coordinates where said new image pixel values are not significantly different than said old image pixel values, comprises providing said transparent pixel value for coordinates where said color quantized new image pixel values are equal to said color quantized old image pixel values.

15. An apparatus for transmitting image updates employing high compression encoding, comprising at least one circuit for:
    comparing new image pixel values against old image pixel values at corresponding coordinates respectively of a new image and an old image;
    providing new image pixel values for coordinates where said new image pixel values are significantly different than said old image pixel values and not equal to a transparent pixel value, and providing said transparent pixel value for coordinates where said new image pixel values are not significantly different than said old image pixel values.

16. The apparatus according to claim 15, wherein said at least one circuit comprises a processor programmed to compare new image pixel values against old image pixel values at corresponding coordinates respectively of a new image and an old image; and provide new image pixel values for coordinates where said new image pixel values are significantly different than said old image pixel values and not equal to said transparent pixel value, and said transparent pixel value for coordinates where said new image pixel values are not significantly different than said old image pixel values.

17. The apparatus according to claim 15, wherein said at least one circuit comprises firmware configured to cause a processor to compare new image pixel values against old image pixel values at corresponding coordinates respectively of a new image and an old image; and provide new image pixel values for coordinates where said new image pixel values are significantly different than said old image pixel values and not equal to said transparent pixel value, and said transparent pixel value for coordinates where said new image pixel values are not significantly different than said old image pixel values.

18. The apparatus according to claim 15, wherein said at least one circuit provides new image pixel values for coordinates where said new image pixel values are significantly different than said old image pixel values unless said new image pixel values are equal to said transparent pixel value, and a pixel value corresponding to an imperceptibly different color than said transparent pixel value for coordinates where said new image pixel values are significantly different than said old image pixel values and equal to said transparent pixel value.

19. The apparatus according to claim 15, wherein said at least one circuit performs color quantization of said new and old images in RGB color space so that pixel values that are not significantly different will be in the same color space.

20. The apparatus according to claim 19, wherein said at least one circuit performs said comparing new image pixel values against old image pixel values at corresponding coordinates respectively of a new image and an old image, by comparing color quantized new image pixel values against color quantized old image pixel values at corresponding coordinates respectively of said new image and said old image.

21. The apparatus according to claim 20, wherein said at least one circuit performs said providing new image pixel values for coordinates where said new image pixel values are significantly different than said old image pixel values and not equal to a transparent pixel value, by providing color quantized new image pixel values for coordinates where said color quantized new image pixel values are not equal to said color quantized old image pixel values or said transparent pixel value.

22. The apparatus according to claim 21, wherein said at least one circuit performs said providing said transparent pixel value for coordinates where said new image pixel values are not significantly different than said old image pixel values, by providing said transparent pixel value for coordinates where said color quantized new image pixel values are equal to said color quantized old image pixel values.

23. An apparatus for transmitting image updates employing high compression encoding, comprising:
means for comparing new image pixel values against old image pixel values at corresponding coordinates respectively of a new image and an old image;
means for providing new image pixel values for coordinates where said new image pixel values are significantly different than said old image pixel values and not equal to a transparent pixel value, and providing said transparent pixel value for coordinates where said new image pixel values are not significantly different than said old image pixel values.

24. The apparatus according to claim 23, wherein said means for providing new image pixel values for coordinates where said new image pixel values are significantly different than said old image pixel values and not equal to a transparent pixel value, comprises:
means for providing new image pixel values for coordinates where said new image pixel values are significantly different than said old image pixel values unless said new image pixel values are equal to said transparent pixel value; and
means for providing a pixel value corresponding to an imperceptibly different color than said transparent pixel value for coordinates where said new image pixel values are significantly different than said old image pixel values and equal to said transparent pixel value.

25. The apparatus according to claim 23, wherein said means for providing new image pixel values for coordinates where said new image pixel values are significantly different than said old image pixel values and not equal to a transparent pixel value, comprises means for providing said new image pixel values for coordinates where said new image pixel values correspond to colors perceptibly different from those corresponding to said old image pixel values unless said new image pixel values are equal to said transparent pixel value.

26. The apparatus according to claim 23, wherein said means for providing new image pixel values for coordinates where said new image pixel values are significantly different than said old image pixel values and not equal to a transparent pixel value, comprises means for providing said new image pixel values in a compressed image file.

27. The apparatus according to claim 23, wherein said means for providing said transparent pixel value for coordinates where said new image pixel values are not significantly different than said old image pixel values, comprises means for providing a repetitive sequence of characters to ensure maximum uniformity and compressibility for coordinates where said new image pixel values are not significantly different than said old image pixel values.

28. The apparatus according to claim 27, wherein said repetitive sequence of characters consists of a binary number having all zeroes.

29. The apparatus according to claim 27, wherein said repetitive sequence of characters consists of a binary number having all ones.

30. The apparatus according to claim 23, wherein said means for providing said transparent pixel value for coordinates where said new image pixel values are not significantly different than said old image pixel values, comprises means for providing said transparent pixel value for coordinates where said new image pixel values correspond to colors imperceptibly different from those corresponding to said old image pixel values.

31. The apparatus according to claim 23, wherein said means for providing a transparent pixel value for coordinates where said new image pixel values are not significantly different than said old image pixel values, comprises means for providing said transparent pixel value for coordinates in a compressed image file.

32. The apparatus according to claim 23, further comprising:

means for decompressing said compressed image file; and means for updating a copy of said old image by retaining old image pixel values of said copy for coordinates having said transparent pixel value, and replacing old image pixel values of said copy with corresponding new image pixel values for other coordinates according to information in said compressed image file.

33. The apparatus according to claim 23, further comprising means for color quantization of said new and old images in RGB color space so that pixel values that are not significantly different will be in the same color space.

34. The apparatus according to claim 33, wherein said means for comparing new image pixel values against old image pixel values at corresponding coordinates respectively of a new image and an old image, comprises means for comparing color quantized new image pixel values against color quantized old image pixel values at corresponding coordinates respectively of said new image and said old image.

35. The apparatus according to claim 34, wherein said means for providing new image pixel values for coordinates where said new image pixel values are significantly different than said old image pixel values and not equal to a transparent pixel value, comprises means for providing color quantized new image pixel values for coordinates where said color quantized new image pixel values are not equal to said color quantized old image pixel values or said transparent pixel value.

36. The apparatus according to claim 35, wherein said means for providing said transparent pixel value for coordinates where said new image pixel values are not significantly different than said old image pixel values, comprises means for providing said transparent pixel value for coordinates where said color quantized new image pixel values are equal to said color quantized old image pixel values.

* * * * *